Dec. 31, 1963  H. F. DRNEC ETAL  3,115,813
BOX COVER FORMING MACHINE
Filed April 30, 1962  9 Sheets-Sheet 8

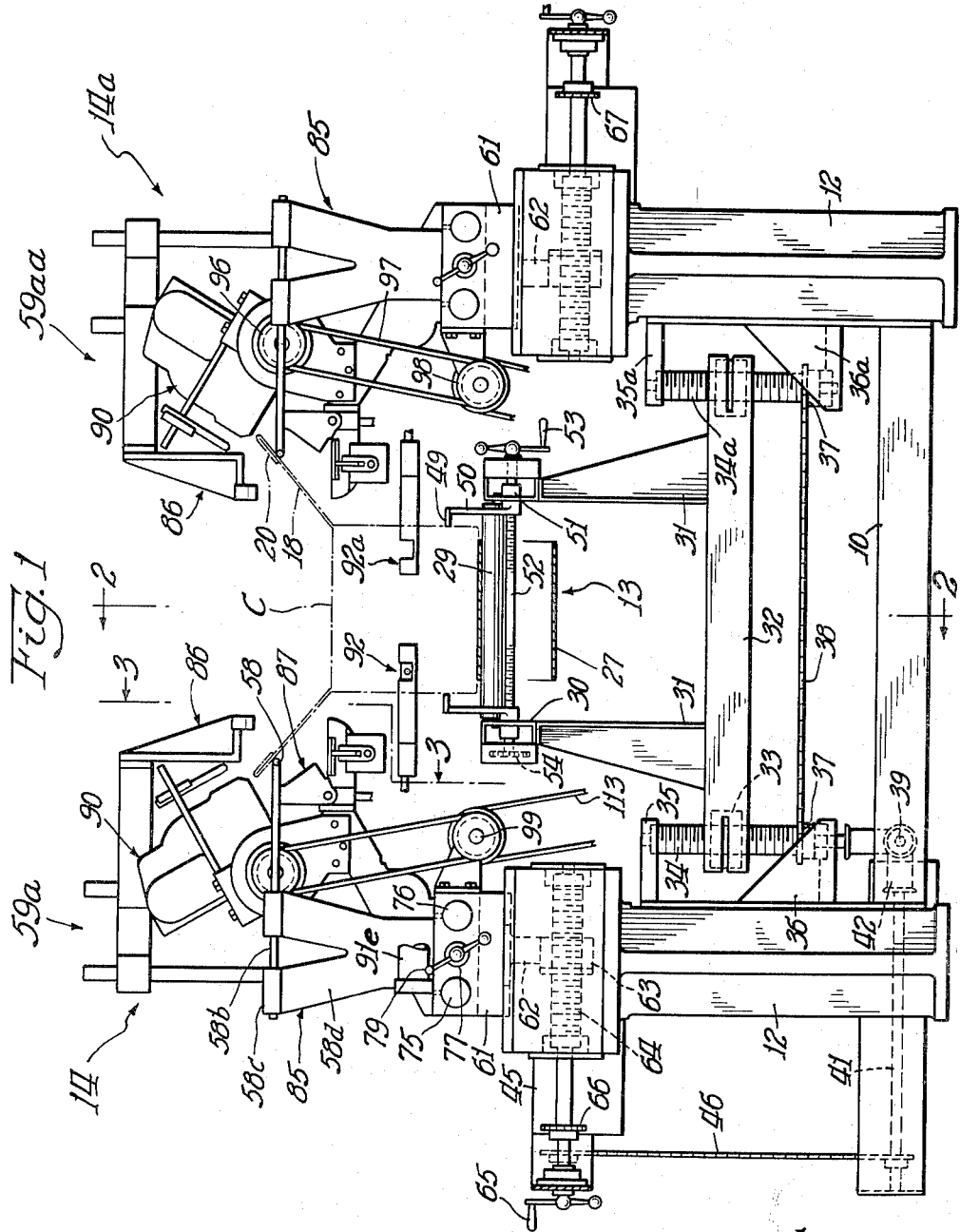

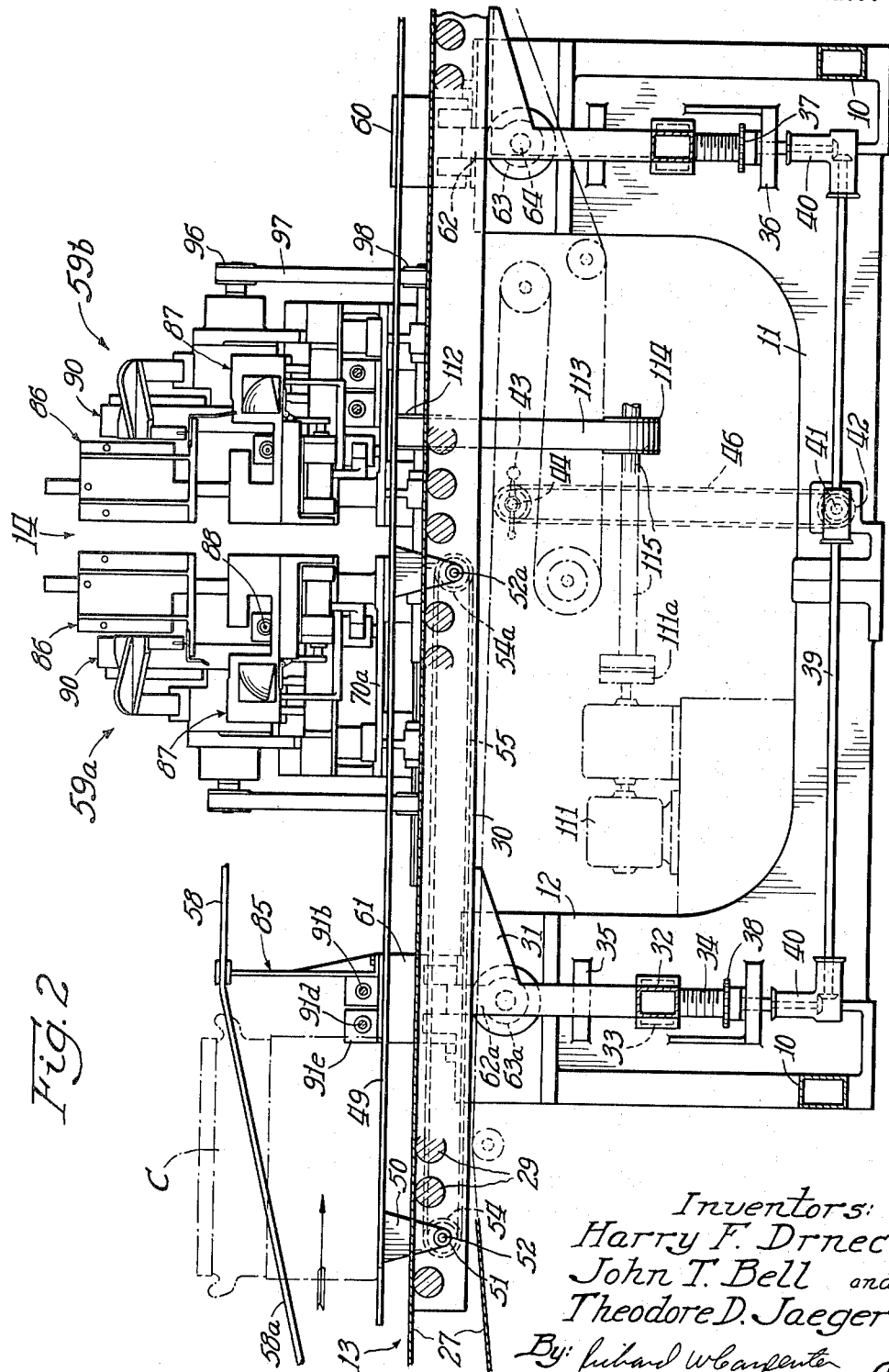

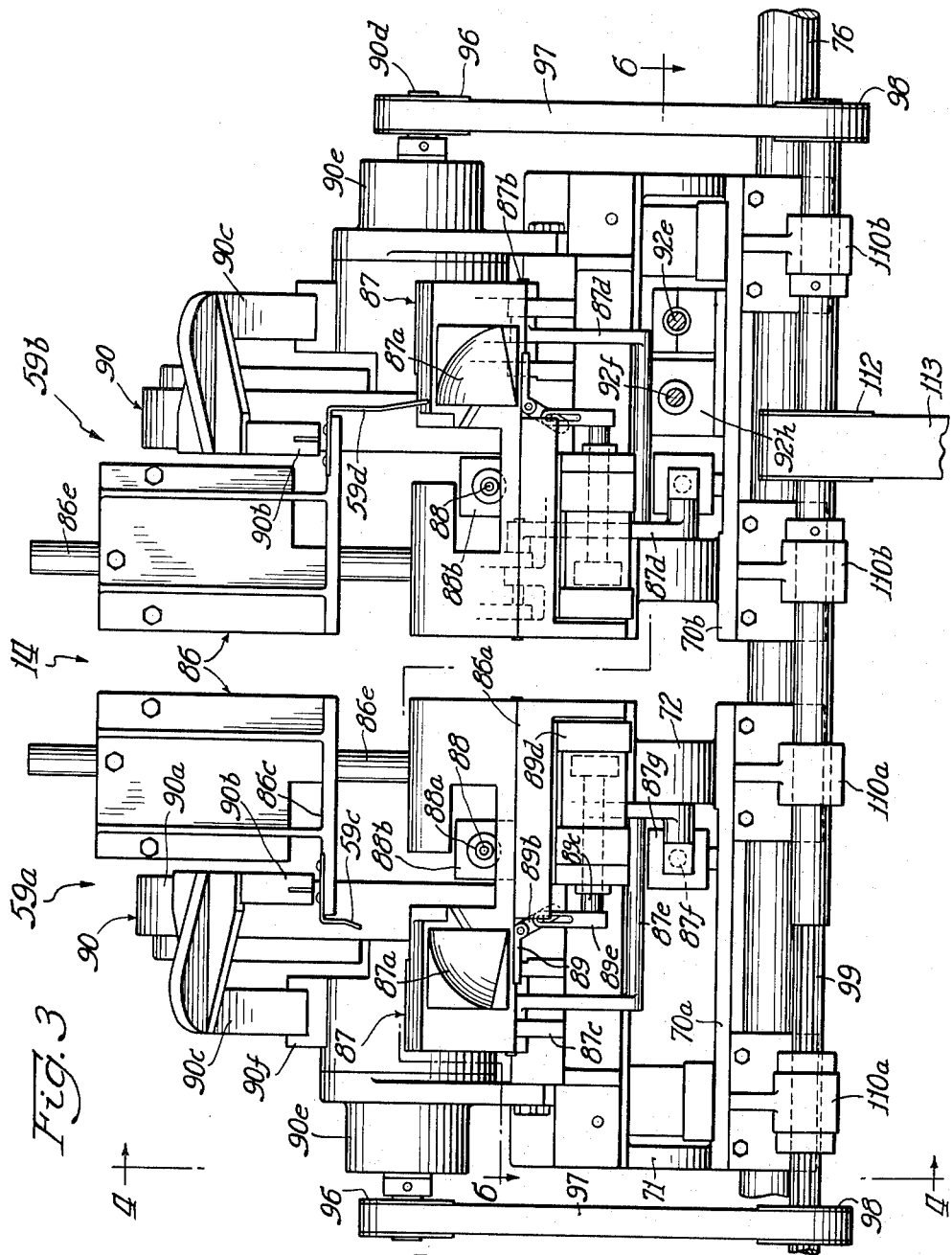

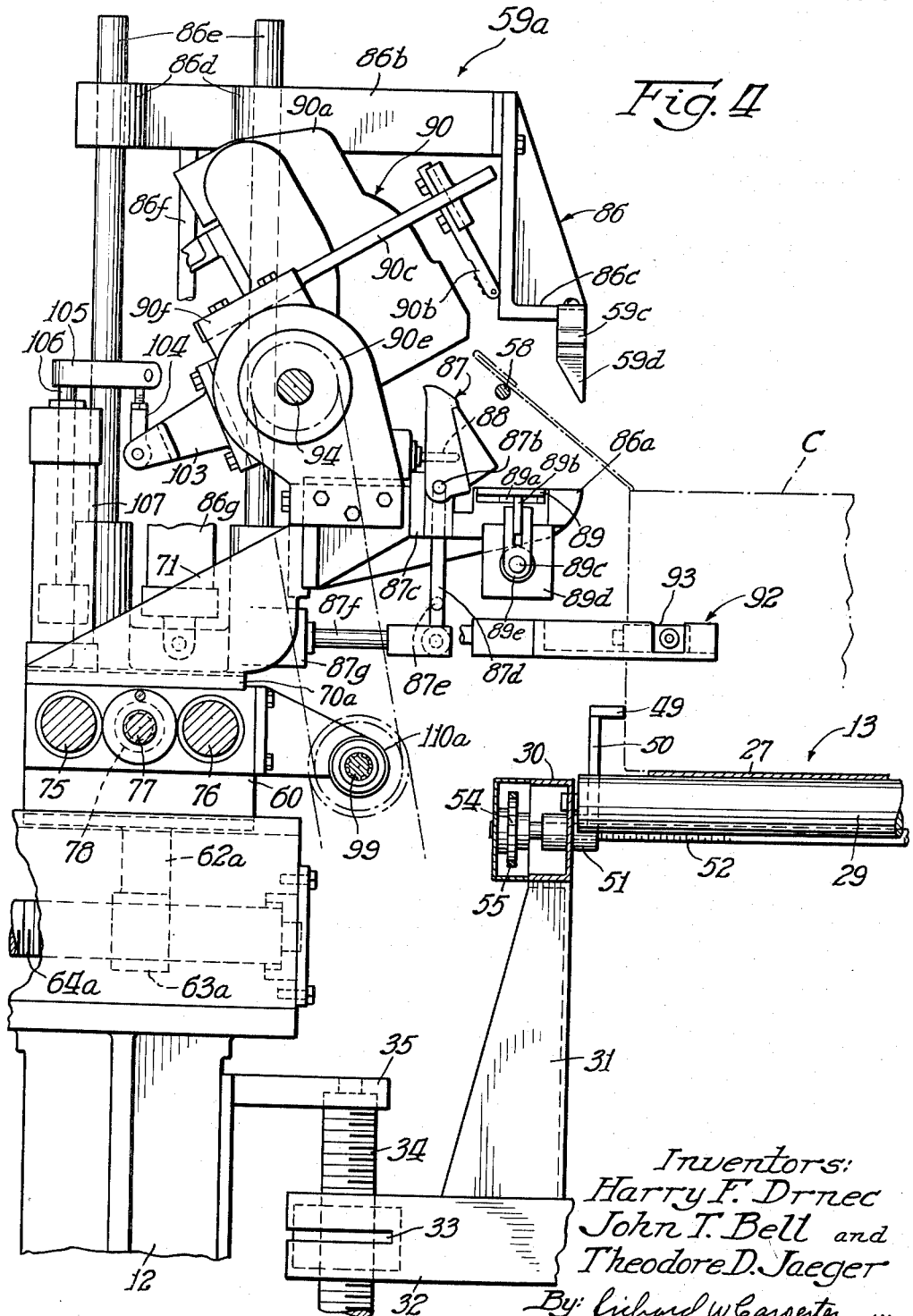

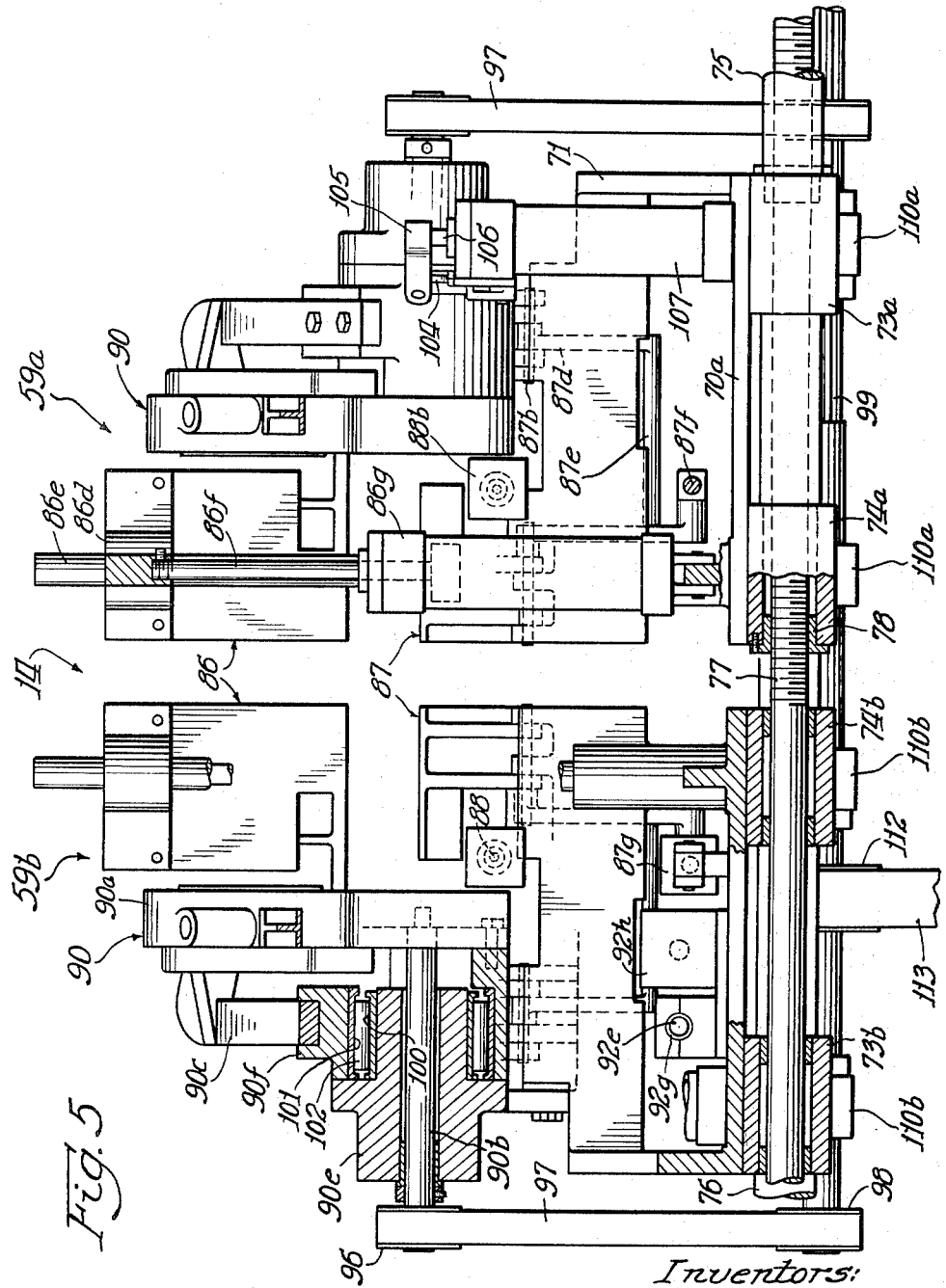

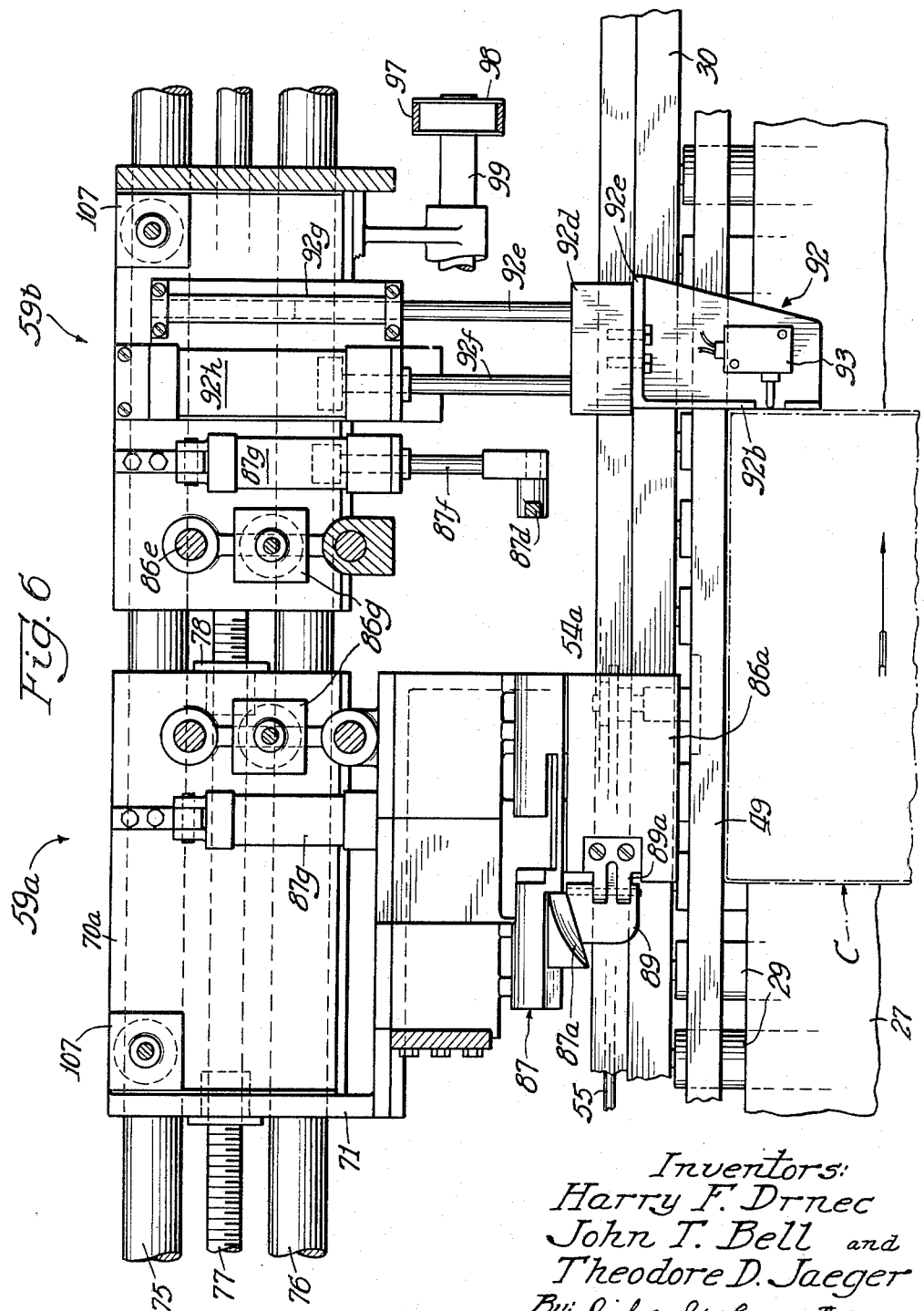

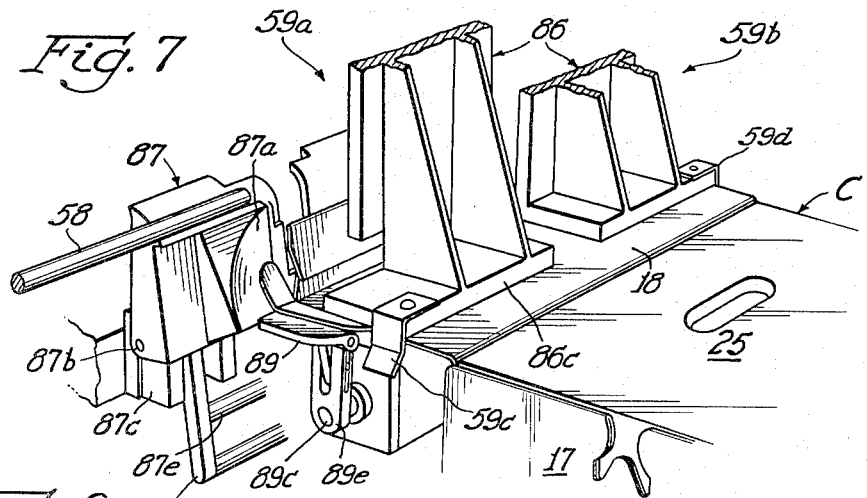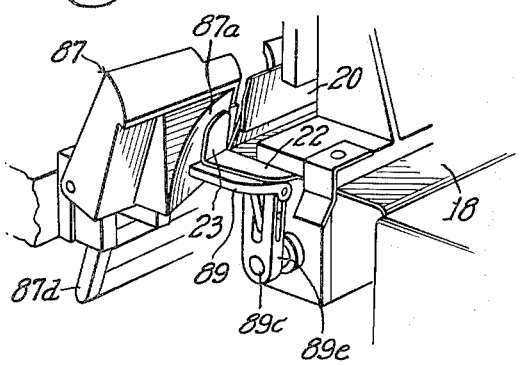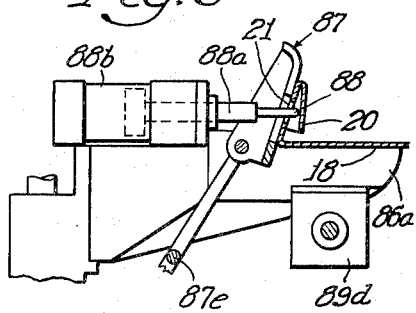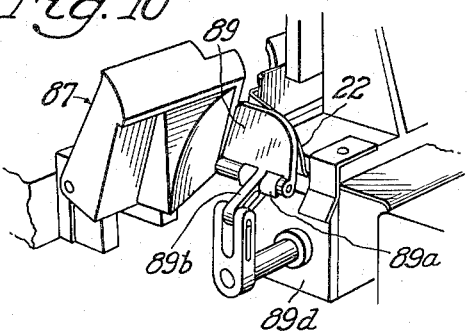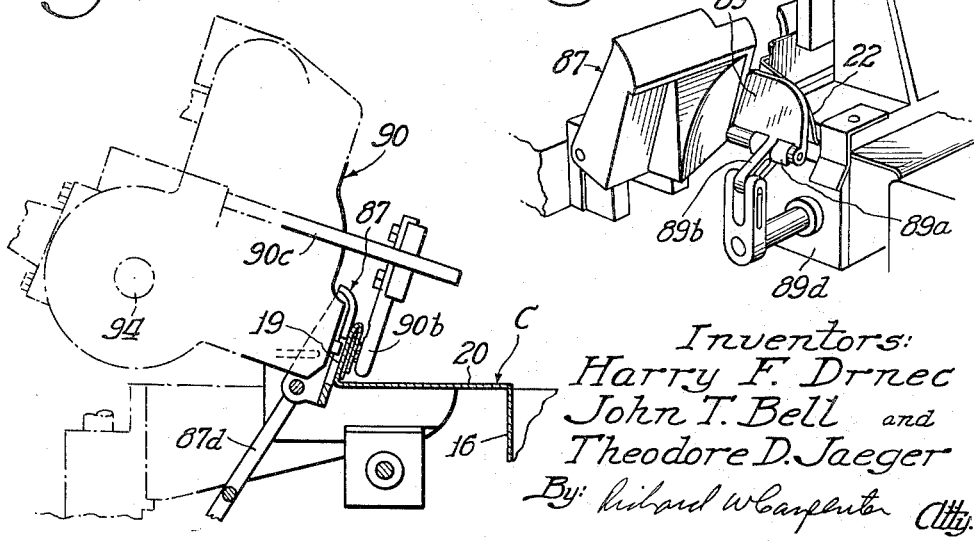

Inventors:
Harry F. Drnec
John T. Bell and
Theodore D. Jaeger
By: Richard W. Carpenter  Atty.

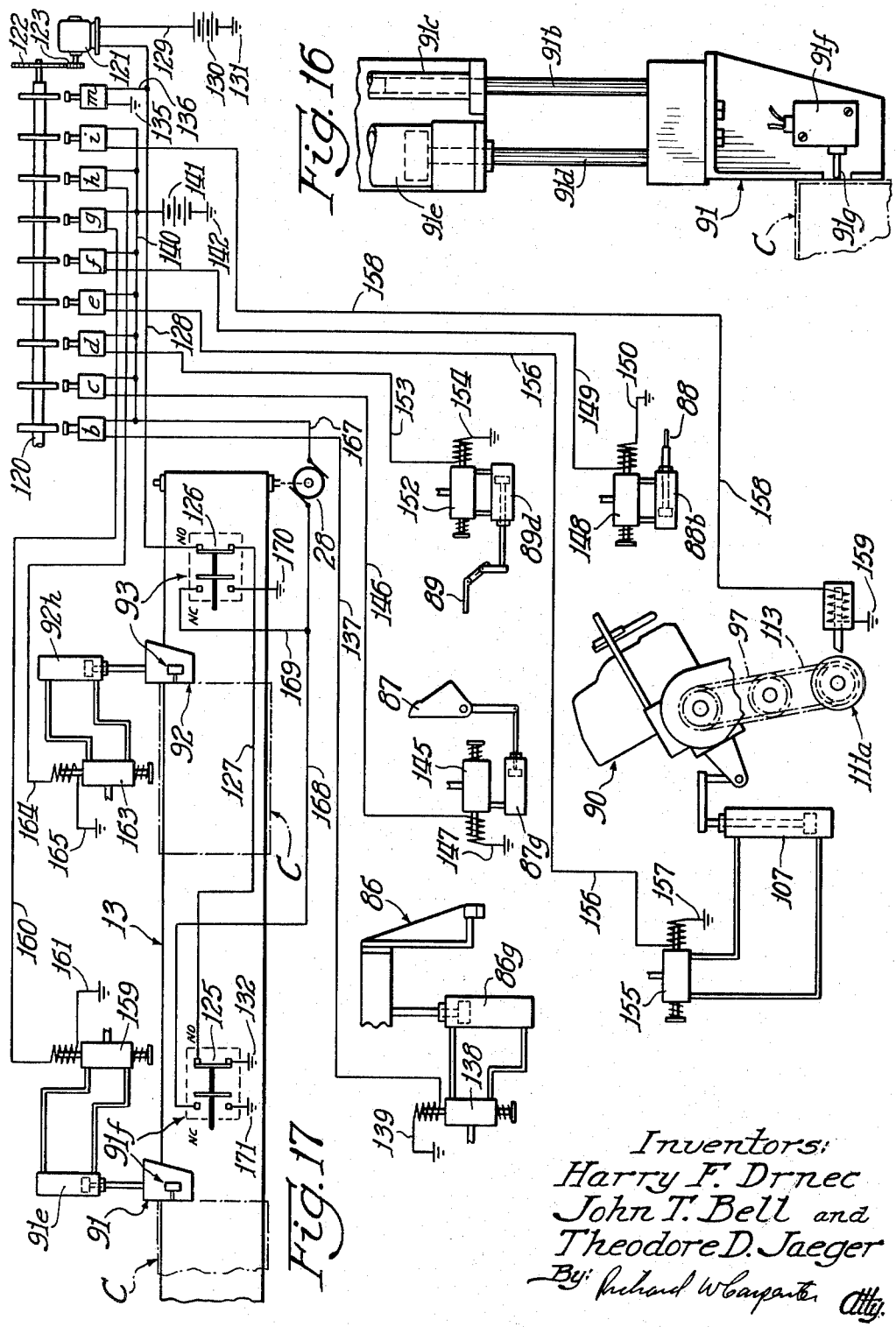

United States Patent Office 3,115,813
Patented Dec. 31, 1963

3,115,813
BOX COVER FORMING MACHINE
Harry F. Drnec, Mount Prospect, John T. Bell, Lombard, and Theodore D. Jaeger, La Grange Park, Ill., assignors to Container Corporation of America, Chicago, Ill., a corporation of Delaware
Filed Apr. 30, 1962, Ser. No. 191,131
18 Claims. (Cl. 93—36)

The present invention relates to machines for forming heavy duty paperboard containers and more particularly relates to a form of machine for folding and securing cover flanges in position for double, hinged-cover solid fibre containers.

The form of container herein shown as the subject of a separate co-pending patent application Serial No. 192,758, filed May 7, 1962, in the name of Harry F. Drnec, John T. Bell, and Theodore D. Jaeger.

The principal object of the invention is to provide a fully automatic machine for receiving partially completed, hinged-cover containers, and conveying them past a treating station or stations designed to fold a cover flange of the container into angular relation with the main panel of the cover and secure it permanently in such position.

Another and more specific object of the invention is to provide a machine for treating a hinged container cover having a folded, double-thickness flange depending from the edge opposite the cover hinge, such machine comprising effective operating parts to fold the double flange into angular position and secure it by means of flaps carried on the edges of the cover at right angles to the hinge.

A further object of the invention is to provide automatic mechanism by which corner flaps carried on end flanges of an elongated hinged cover of a solid fibre container maybe effectively folded and received between the panels of a double-thickness flange on the edge of the cover which is opposite the cover-hinge, such corner flaps being thereafter permanently secured in place between the panels of the double-thickness cover flange.

Additional and more specific objects and advantages of the present invention will become apparent as the description proceeds.

In the drawings showing a preferred form of the invention—

FIG. 1 is an end elevation, as viewed from the receiving end of the machine, showing a container with hinged covers extending and in position for initial treatment by the machine;

FIG. 2 is a cross-sectional view in elevation taken along line 2—2 of FIG. 1, showing a container being conveyed toward the cover treating station;

FIG. 3 is a partial vertical sectional view on an enlarged scale taken along line 3—3 of FIG. 1 showing details of certain operating parts;

FIG. 4 is a vertical sectional view on the same scale as FIG. 3, and taken along line 4—4 of such figure, showing the flange folding parts in open position and with a container cover in place between such folding parts;

FIG. 5 is a partial vertical elevational view with parts broken away, showing the cover flange treating mechanism as viewed on the side opposite to that shown in FIG. 3, or as viewed from the left side of the machine as shown in FIG. 1, looking toward the right;

FIG. 6 is a horizontal sectional view taken substantially along line 6—6 of FIG. 3 looking in the direction of the arrows;

FIG. 7 is a fragmentary perspective view showing one of the covers which has received its first folding treatment;

FIG. 8 is a detailed perspective view showing the cover flange folded to an inwardly inclined position relative to the main panel of the cover and showing the corner flap on the end flange folded up and ready to be tucked in between the flange panels;

FIG. 9 is a detailed view showing the inner panel of the cover flange displaced inwardly to spread the panels apart preparatory to receiving the corner flaps;

FIG. 10 is a detailed perspective view similar to FIGS. 7 and 8, showing the end flange folding plate in raised position after it has been swung up to cause the corner flap to move into place between the spread panels of the double-thickness flange;

FIG. 11 is a fragmentary, vertical sectional view showing the corner flap being stapled to the panels of the double-thickness flange as it is held between such panels;

FIG. 16 is a detail view of the advance stop located at the receiving side of the machine; and FIG. 17 is a schematic view of the wiring.

Figure 12:
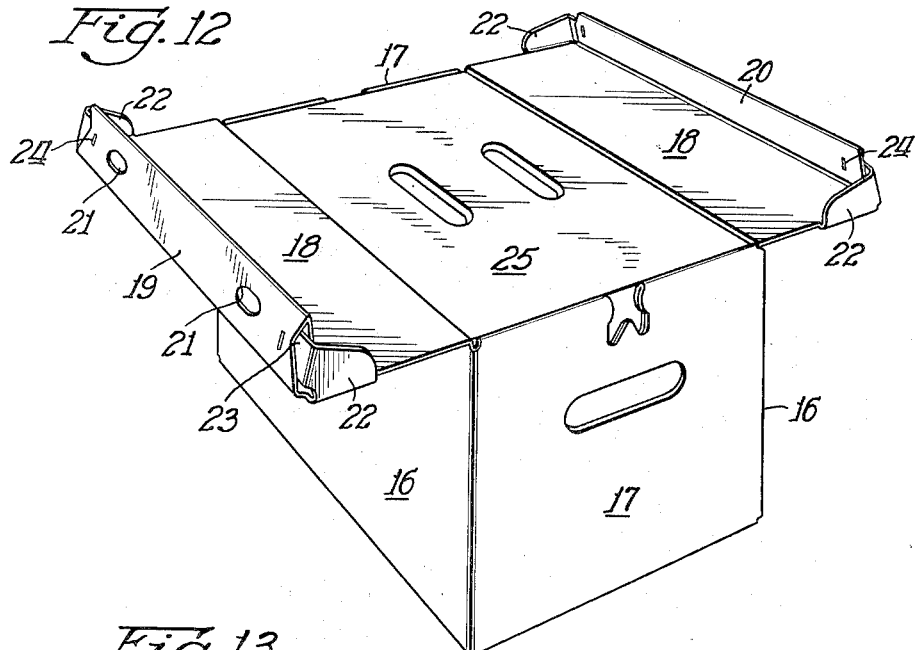
FIG. 12 is a perspective view of a container of the type for which the present mechanism is adapted.
Figure 13:
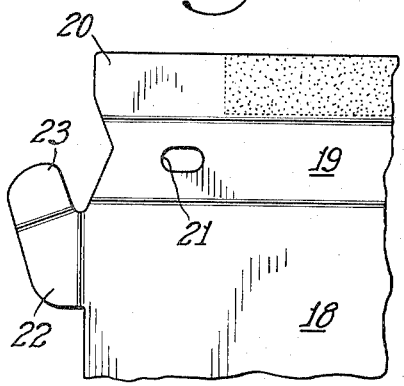
FIG. 13 is a fragmentary view showing a corner portion of the container cover as it appears in blank form before folding.

In the production and use of heavy duty, returnable boxes made from paperboard and provided with flanged covers, it has been generally customary to form the flanges on the covers at the container manufacturing plant. This is particularly the case with containers made from very sturdy, solid fibre board designed for a large number of repeated uses. The stiffness of the board makes it difficult for the user to fold and secure the cover flanges manually. For this reason the cover flanges have been formed at the container plant where heavy equipment is available. This has the disadvantage of making the containers more bulky in shipment and storage; and, even though the body portion of the container is made in collapsible form, the collapsed blanks with set-up cover flanges are inconvenient to handle, transport and store.

The present invention provides a machine which can easily be employed by the user of heavy duty solid fibre containers to set up the cover flanges in a rapid and effective manner and to place containers promptly into customary production lines, the supply of collapsed containers meanwhile, before use, being retained in a relatively flat compact form to minimize storage problems.

The machine is particularly designed to assemble flange parts on a paperboard cover of rectangular form having a flange along one side adapted to be folded from a position in the plane of the cover main panel to a raised position relative to the interior side of the main panel. The cover has end flaps or flanges which carry short corner flaps foldable to a position substantially in the plane of the first mentioned flange so that it may be secured to such flange. In its preferred form, the machine is designed to secure the corner flaps in between the two adjacent panels of a double-thickness main flange of the cover. In this case the panels of the double-thickness flange are secured over a substantial part of their length in their midportions, leaving unsecured portions at their ends for reception of the corner flaps. The machine includes means for spreading the unsecured flange portions apart to admit the corner flaps. This means, in its preferred form, comprises a movable spreading finger located to enter an opening in one panel of the flange to apply pressure against the other panel to displace such panel sufficiently to allow the adjacent corner flap to be inserted between the panels.

The machine, as herein disclosed, includes a conveyor to advance partially set-up containers to a treating station. The container upon being brought to expanded form may, if desired, have a mandrel or form placed inside the container to hold its walls in rectangular relation and thereby to hold the opposite hinged covers on the side walls in a firm, accurate relation to the operating mechanism. As the container is moved toward the treating station the covers are suitably guided to an extended position. Upon arrival at the desired point the container is brought to a stop by displaceable stop means. At the same time a switch is opened to stop the conveyor and another switch is closed to start a motor driving a cam shaft to control the subsequent operations. The essential operations comprise moving folding heads down on the cover main panels while the double-thickness principal flanges are held against fixed elements to cause the flanges to be folded upright as the main panels are forced down. With the cover main panels held in fixed position the double flanges are folded somewhat farther inwardly by auxiliary folders. Spreading fingers move through the apertured panels to spread apart the panel end portions at each end of each cover ready to admit the corner flaps. Folder members swing the corner flaps upward at each outer corner of the covers and, while these flaps are so held, additional folder members swing the end flanges up, causing the corner flaps to be inserted between the separated flange panels. The spreading fingers are then retracted and stitching heads are each swung into position on one side of the double flanges with anvil members bearing against the other side. Stitches are driven, the stitching members are swung clear, the end flange folders and auxiliary double flange folders are returned to inoperative positions, the folding heads for the cover main panels are raised, the container stop released to allow the container to advance, and the conveyor moves the completed container away from the treating station. Another container is then moved into position to continue the cycle of operations.

Referring more particularly to the drawings, the machine is supported on suitable horizontal and vertical base members 10, 11 and 12. Extending longitudinally of the base is a conveyor indicated as a whole at 13, which, if desired, may be a section of a conveyor of extended length to carry a considerable number of expanded containers C, C ready for delivery to the cover treating station. At the sides of conveyor 13 are located unitary treating members 14 and 14a for operating simultaneously on two opposite container covers. Each treating member is designed to operate on both ends of each cover simultaneously.

The present machine is adapted for various adjustments to accommodate containers of varying heights, lengths and widths. To adjust for changes in container height the frame of conveyor 13 may be raised or lowered. To adjust for different container lengths the treating members 14 and 14a are each made in separate parts on the same base so that the two parts of each member may be moved toward or from each other as desired. To adjust for varying widths the base frames of the members 14 and 14a may be moved laterally and uniformly toward or from the center line of the machine.

Figure 14:
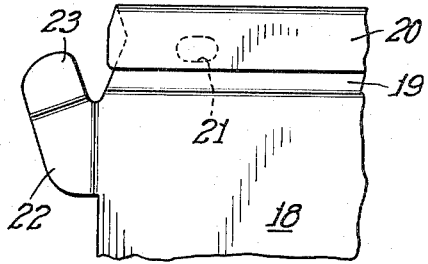
FIG. 14 is a view similar to FIG. 13, showing the flange forming parts folded together and secured as by adhesive applied over their median portions with the end portions left unsecured.
Figure 15:
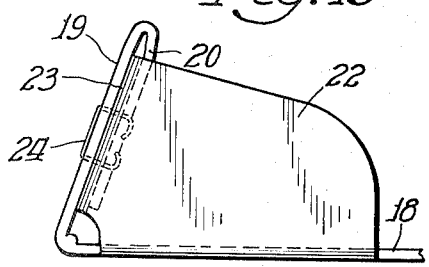
FIG. 15 is a fragmentary end view of one of the completed covers showing the corner flap stapled in place between the panels of the double flange.

The container for which the present machine is particularly designed, as shown in FIGS. 12 to 15, may advantageously be formed from a single blank of solid fibre board, having side walls and end walls secured in tubular form. In addition, the outer flange panel is preferably secured upon the inner panel as indicated in FIG. 14. The containers may thus be prepared in flat collapsed form and so delivered to the user.

FIG. 12 shows the completed container after treatment by the present machine. As above stated, the side walls 16, 16 and end walls 17, 17 are secured in tubular form. Each side wall carries at its upper edge a hinged cover having a main panel 18 and a double-thickness flange formed by narrow panels 19 and 20 secured to each other over a substantial length of their mid-portions as by means of adhesive, indicated by stippling in FIG. 13. The outer portions of the double flange are left unsecured and an aperture 21 is formed in the unsecured part at the ends of one of the panels, herein indicated as panel 19, to facilitate spreading the flap portions apart to admit the corner flap.

At the ends of each cover are end flaps or flanges 22, 22, each carrying a corner flap 23 which is inserted between the unsecured ends of the flange panels 19 and 20 and held by stitches 24 passing through the panels and cover flap. See FIG. 15. The container blank is suitably creased or scored in the usual manner to facilitate folding of the various panels and flaps. When the container is made from one-piece blank four bottom flaps are provided, one on each of the side and end walls and such flaps are secured together in overlapping relation to close the bottom of the container.

As indicated in broken lines in FIGS. 1, 2 and 4, the container is brought to the treating station of the machine with all the panels and flaps of each cover extended in a common plane except that panel 20 has been folded over and secured to panel 19, as shown in FIG. 14. Prior to feeding the containers through the machine a mandrel 25 may be placed in each expanded container. In practice the bottom closure flaps of the container are brought to closing position before insertion of the mandrel.

*Conveyor Construction*

The conveyor, as best shown in FIGS. 1 and 2, comprises an endless belt 27 of usual form passing over end rollers 29, 29 mounted in longitudinally extending channel bars 30, 30 secured on upstanding frame members 31, 31, supported on transverse members 32, 32. At the ends if the members 32 are interiorly threaded blocks 33, 33 into which are received vertically disposed threaded rods 34, 34a each rotatably mounted in upper and lower brackets 35, 35a and 36, 36a attached to vertical base frame members 12, 12. By rotating the threaded rods the conveyor may be vertically adjusted.

In order to rotate the threaded rods in unison the rods 34 and 34a at opposite ends of the machine have sprockets 37, 37 keyed thereon. A sprocket chain 38 passes over each pair of sprockets. The threaded rods 34, 34 at opposite ends of the machine, and located on the left, as viewed in FIG. 1, each have an extended shaft geared to a horizontal, longitudinally extending shaft 39 by means of bevel gears contained in the gear housings 40, 40. See FIG. 2. The shaft 39 can be rotated by means of a short shaft 41 connected to shaft 39 through bevel gears in gear housing 42. See FIG. 1.

Shaft 41 can be rotated by a crank 43 on short shaft 44, journalled in a bracket member 45, and having a sprocket chain connection 46 with shaft 41.

At the sides of the conveyor belt are upstanding guide bars 49, 49 attached to vertically extending supports 50, 50. The supports can be moved symmetrically toward or from the center line of the conveyor and for this purpose the supports are provided with interiorly threaded bosses 51, 51 extending through openings in the channel bars 30, 30. The threads in the bosses are reversed and receive the opposite ends of reversely threaded rods 52, 52a. Rod 52 is fitted with a hand crank 53 at one end and has a sprocket 54 secured to its other end. A sprocket 54a is secured on threaded rod 52a and this is driven by a sprocket chain 55 passing over sprockets 54 and 54a. Rotation of crank 53 will enable the operator to bring guide bars 49, 49 into the desired positioning to guide a container accurately into the treating station.

At the sides of the conveyor there are arranged plow rods 58, 58 to guide the container covers to proper position. The mounting of these rods will be explained in due course.

*Flange Folding and Securing*

The flange folding and securing members are arranged in pairs of sub-units designated as a whole at 59a, 59b and 59aa, 59bb, each sub-unit constituting a segment of the treating station. The pairs of sub-units at opposite sides of the conveyor are mounted for lateral, or in and out, movement to accommodate containers of varying widths. The sub-units 59a and 59aa are mounted for rapid adjustment longitudinally of the conveyor to accommodate containers of varying length. The sub-units 59b and 59bb are intended to remain generally in fixed position.

Each side member, consisting of a pair of sub-units, is mounted on the longitudinal frame sections secured on vertical base frame members 12, 12. The base portion 60 of the sub-unit 59b, shown at the right in FIG. 2, and its counterpart in sub-unit 59bb, are located in generally fixed position on the base frame members. The base portions 61, 61 of the adjacent sub-units are relatively adjustable lengthwise of the conveyor. Each set of the two base portions 60 and 61 is movable laterally as a unit toward and from the conveyor. For this purpose depending bracket arms 62a and 62 are secured on the under side of the respective bases 60 and 61. These arms carry bosses 63a and 63, having threaded openings to receive threaded rods 64a and 64 respectively mounted in bearings and rotatable by means of a hand crank 65 as seen on the right side of FIG. 1. For the purpose of rotating all the threaded rods simultaneously sprockets 66 and 67 are secured on the shaft portions of the threaded rods. These sprockets may be driven in unison by sprocket chains and suitable gearing, not shown. The particular mechanism for obtaining synchronous adjustment of the various parts is generally conventional and not part of the invention.

Sub-units 59a and 59aa are preferably mounted for longitudinal adjustment relative to the respective sub-units 59b and 59bb. For this purpose a horizontal plate 70a of each sub-unit 59a and 59aa is mounted on the base portion 61 for movement parallel to the conveyor. Upstanding side flanges 71 and 72 on these horizontal plates support additional parts presently to be described. On the under side of the plate 70a and plate 70b of sub-unit 59b are rigidly secured box-like guide members 73a, 74a and 73b, 74b respectively having openings to receive longitudinally extending guide rods 75 and 76. See FIGS. 1, 4, 5 and 6. These rods serve as supporting members to guide the sub-units 59a, 59aa as they are being adjusted bodily to different positions. As shown in FIGS. 5 and 6, the box-like members are formed with openings between the rods 75 and 76 to receive a threaded rod 77, the threads of which extend a distance of one-half or more of its length. An interiorly threaded sleeve 78, secured in member 74a, receives the rod 77, so that rotation of the threaded rod can adjust the sub-unit. The rod 77 may be manually rotated by a crank 79. See FIG. 1.

The treating devices on each sub-unit are substantially alike except that those devices of units 59a and 59aa, which are designed to operate on the end flanges and corner flaps, are reversely placed with respect to the equivalent devices included in units 59b and 59bb. For simplicity of description the detailed description generally will be limited to sub-unit 59a, shown in FIG. 4, at the left in FIGS. 1, 2, 3 and 6, and the right in FIG. 5.

The mechanism of sub-unit 59a comprises a plow rod support 85, a cover folding and clamping member 86, a folder or positioning member 87 for the main cover flange and corner flap, a flange spreader finger 88, a folder 89 for the end flange, and a stitcher unit 90. In addition, a retractable stop 91 may be located in advance of sub-unit 59a to hold the leading container, next be advanced to the treating station, and a pair of retractable stops 92 and 92a may be associated with sub-units 59b and 59bb to hold the container being treated in proper relation to the treating devices.

*Plow Rod Construction*

The container to be treated, in certain production lines, may be delivered from a conveyor section on which the bottom closure flaps have been secured and the unfinished covers are folded down and held against their attached side walls. As the containers are advanced from this conveyor section and the unfinished covers swing outwardly due to their resiliency, they will come to a level at which they will engage the upper side of the outwardly inclined sections 58a, 58a of the plow rods. See FIG. 2. As the container makes its advance to the treating station the covers will be raised to an upwardly inclined position as shown in FIGS. 1 and 4. In order to adjust the plow rods to different heights or widths of containers a short rod section 58b is attached to the plow rod 58 and is slidably held in guide openings in bosses 58c, at the upper end of a frame 58d, herein shown as Y-shaped and secured on the base portion 61. The end of plow rod 58 extends to a point at which the trailing portion of the cover is still supported by the plow rod while the leading edge of the cover is supported by folding elements presently to be described.

*Cover Folding and Clamping*

In FIG. 4 the cover is shown at a point where it is ready to slip from the end of the plow rod 58 which will allow the cover to swing down for preliminary folding of the double flange. After the container passes the point where the cover leaves the plow rod the advancing end of the container will strike the stops 92 and 92a to prevent further advance of the container. Simultaneously the finger of a switch 93 on one of the stops will be actuated as part of the means to control the flow of current in an electric circuit. The drive for the conveyor belt is preferably interrupted at this point and a controlled sequence of operations is begun which will fold and secure the flange parts on the covers, then to withdraw the stops and start the conveyor to remove the finished container to be treated. The details of the construction and operation of the stops and electrical controls will be explained in due course.

With the stops retained in place and with the cover advanced clear of the end of the plow rod 58, the folding and clamping member is ready to operate. As shown in FIGS. 4 and 7 the frame section 71, carried on the plate 70a includes a projecting bracket 86a having a flat upper surface disposed at approximately the level where the main cover flange may come to rest flatwise upon such bracket. A horizontal, vertically movable arm 86b carries at its end a folding and clamping element 86c having a flat lower surface arranged to bear upon the main cover panel and hold it against the surface of bracket 86a. The arm 86b has a pair of apertured bosses 86d, 86d which receive vertical guide rods 86e, 86e and intermediate the bosses there is secured a piston rod 86f having a piston operating within an upright cylinder 86g secured at its lower end on the plate 70a. See FIG. 5. Control of fluid pressure to the piston will be explained in due course. The operation is such that the clamping element is brought to its lowered position and held firmly against the closure main panel while the flanges are being secured.

Centering guides 59c and 59d are provided on the clamping elements to shift the cover slightly if it should be out of proper position as the clamping elements descend. The guide 59c is secured on the clamping element for sub-unit 59a and guide 59d is on the clamping element for sub-unit 59b. See FIG. 3.

As best shown in FIG. 7, the lowering of the clamping element causes the double flange to bear against the upright surface of the flange positioning element 87. This element is generally wedge shaped and has an upper rounded surface blending into an upright surface. Another section of the surface of element 87, indicated at 87a, serves as a guide for the corner flap and will be explained below.

As soon as the clamping element 86 has reached its lowermost position the positioning element 87 is preferably rocked toward the double flange to fold it beyond a plane which is normal to the cover main panel and inclined toward the cover hinge, as shown in FIG. 8. It is to be noted that the corner flap 23 is partially folded upward as shown in FIG. 7 and further folded toward the cover hinge to assume approximately the same plane as the double flange.

For the purpose of rocking the positioning element 87, it is mounted on a pivot indicated at 87b supported in brackets 87c. A pair of bars 87d rigidly secured to the element 87 extend downward and are connected by a cross rod 87e. A piston rod 87f is hingedly connected to the cross rod and carries a piston operating in cylinder 87g. See FIGS. 4 and 6. Control of fluid pressure to the cylinder will be described below. The operation is such that the positioning member will be held in its tipped position while the corner flap is being inserted between the panels of the double flange and while the flap is being secured in place.

Separation of Double Flange Panels

While the clamping element 86 is holding the cover main panel firmly, as shown in FIGS. 7 and 8, and the flange positioning element 87 is holding both the double flange and the corner flap in the same plane, the spreader finger 88 is projected through the flange panel opening 21, as shown in FIG. 9, to bear against the unsecured part of panel 20 and spread it away from panel 19. The spreader finger may be formed in various ways but preferably is formed as an extension of a piston rod 88a having a piston movable in cylinder 88b secured in fixed position on a plate attached to frame sections 71 and 72. The flange positioning element has a central portion suitably cut away to allow the spreader finger free access to the flange panel. See FIG. 9. Control of fluid pressure to cylinder 88b will be described below. The operation is such that the spreader finger will be held in its advanced position until the corner flange has been inserted between the separated panels. It is to be noted that the spreader finger operates at a sufficient distance from the end of the double flange so that it does not interfere with the insertion of the corner flap.

Insertion of Corner Flap

While the parts of the mechanism are held in the positions shown in FIG. 8 with the spreader finger in its projected position, as shown in FIG. 9, the end flange folder 89 is swung up into position. At the same time the the corner flap 23, being guided by the guide surface 87a formed on the positioning member 87, will move edgewise into the space between the flange panels 19 and 20. For the purpose of swinging the end flange folder it is mounted at its lower edge on a hinge pin held in bearings 89a on the end of the cover supporting bracket 86a. A slotted arm 89b is rigidly secured on the folder at an angle somewhat in excess of 90°. See FIG. 10. The slotted arm is swung by means of a piston rod 89c carrying a piston movable in cylinder 89d. At the end of the piston rod is secured a U-shaped connecting element 89e adapted to receive the arm 89b between its prongs and at the upper ends of the prongs is secured a pin received into the slot in the arm 89b. When the folder is in its lowered position, as shown in FIGS. 7 and 8, the pin held in the U-shaped connecting element is near the upper end of the slot in the arm. As the piston rod is extended the pin in the connecting element moves along the slot as it swings the arm. Control of fluid pressure to the cylinder 89d will be described below. The operation of the piston rod is such that it will be held in extended position until the corner flap is secured between the flange panels.

After the corner flap has been inserted between the separated panels it is no longer necessary for the spreader finger to hold the end of flange panel 20 away from panel. The spreader finger is therefore withdrawn at this time.

Securing the Corner Flap

As soon as the spreader finger is retracted the stitching unit 90 will be swung into operative relation to the double flange. See FIGS. 3, 4, 5 and 11. This unit comprises a stitch setting or driving mechanism enclosed in a casing 90a, and clinching anvil 90b movably secured on an arm 90c bolted to the casing. By comparison of FIGS. 4 and 11, it can be seen that the stitcher is mounted to rock through an angular distance of approximately 50° so that in its inoperative position it will remain clear of the area through which the cover panel is moved. In its operative position the stitch driving head and anvil will closely engage the double flange preparatory to insertion of the stitch. With the exception of its mounting, the stitching unit is conventional. A spool of flat wire is suitably supported within a guard housing and the wire from the spool is fed into mechanism which bends the wire to shape, cuts it off and drives it through the paperboard. The stitch driving mechanism includes a suitable single-revolution clutch which is designed to be engaged immediately after the tilting of the unit to the desired position embracing the double flange. The stitching mechanism is driven through suitable gearing operated by a shaft 90d journalled in a stationary bearing block 90e fixed on parts carried by frame sections 71 and 72. See FIG. 5. At its outer end the shaft 90d carries a belt pulley 96 over which passes a belt 97 which in turn passes over a pulley 98 on a shaft 99 arranged to be driven by a motor on the base frame. The transmission from the motor to shaft 99 will be explained below.

The bearing block 90e has an exterior bearing surface 100 on which the stitching unit casing is tiltably mounted. A frame section 90f, secured to the casing, has an interior bearing surface 101 and between these two bearing surfaces are roller bearings 102.

For the purpose of tilting the stitching unit, a bracket arm 103 is bolted onto the rear part of bearing block 95. See FIG. 4. A vertical link 104 connects the arm 103 to an arm 105 carried on a piston rod 106 carrying a piston operating in cylinder 107. Upward movement of the piston rod as seen in FIG. 5, will cause the stitching unit to rock to its operative position as shown in FIG. 11. Control of fluid pressure to cylinder 107 will be described below. The operation is such that the stitching unit will be tilted to operative position following retraction of the spreading finger 88. Upon arrival of the stitching mechanism into embracing relation to the double flange a stitch is driven through the flange panels and enclosed corner flap and, immediately afterward, the stitching unit is tilted back to inoperative position.

Following the movement of the stitching unit to inoperative position the flange positioning member 87 and end flange folder 89 are returned to their original positions and the clamping member 86 is moved to fully raised position. With the finished cover freed of the treating devices, the retractable stops 92, 92a are withdrawn from the container path and the conveyor 13 is placed in motion to advance the container beyond the treating station.

In order to enable the sub-units 59a to be adjusted easily with respect to sub-units 59b, and without requiring tedious repositioning of belt pulleys, the shaft 99 is splined to enable the pulley 98 to slide along the shaft and still remain constantly in operative position. Bracket members 110a, 110a are secured on base portions 73 in sub-unit 59a and bracket members 110b, 110b are secured on the equivalent portions in sub-unit 59b. Between bracket members 110b, 110b is secured a pulley 112 driven through belt 113 by a pulley 114 on drive shaft 115. See FIG. 2. This drive shaft is suitably journalled on the base frame and is driven by a motor 111 also mounted on the base frame. The motor is constantly operating while the machine is in use and drives the input side of a single-revolution, solenoid-actuated clutch 111a. The output side of this clutch may be secured onto the end of shaft 115. Control of clutch 111a will be described below.

Retractable Stops

The retractable stops 92 and 92a, as herein shown, are similarly constructed. They are guided for horizontal movement and are operated by a piston and cylinder mechanism. Referring to FIG. 6, showing stop 92, this stop preferably comprises a flat plate with an upturned front flange 92b and side flange 92c bolted onto block 92d. The block has secured to its rear face a guide rod 92e and piston rod 92f. The guide rod is slidable in member 92g secured to the base portion 61 and piston rod carries a piston operating in a cylinder 92h also carried on the base portion 61. Control of fluid pressure to the cylinders of both stops will be described below. As above explained, the operation is such that as soon as the container is free from the clamping member 86 the stops are retracted and the conveyor is started to advance the finished container.

Each stop element 92 and 92a preferably has its front flange cut away as shown in FIG. 6 to accommodate the operating finger of a switch secured on the flat plate portion of the stop. A single switch is sufficient at this location and may be positioned on either stop as desired. In the present instance a switch is employed only on stop 92.

The stop element 91, which may be referred to as the advance stop, is located on the intake side of the treating station at a distance from the treating members in excess of the length of the longest container for which the mechanism is adapted. This stop may be identical in construction with stop 92. The operating parts comprise a guide rod 91b received in a guide 91c secured to the base frame and a piston rod 91d having a piston operating within cylinder 91e. A switch 91f, including a switch operating finger 91g, is mounted on the stop plate in position so that an advancing container, coming into contact with the stop, will also engage the switch finger to actuate the switch. Control of fluid pressure to the cylinder will be described below. The operation is such that the stop 91 will be retracted to clear the path of the container so that it may be advanced toward the treating station as the finished container leaves such station.

The present machine may be employed with conveying and feeding mechanism for a row of unfinished containers abutted end to end, such mechanism including controls for separating the leading container from the row and delivering it into position against the advance stop element 91. The remaining row of abutted containers, in practice, will advance the length of one container. The normal operation comprises operating conveyor 13 intermittently to move the finished container from the treating station; moving the container temporarily held by the advance stop; moving both the advance stop and the treating station stops into the paths of the containers; and stopping the conveyor after the containers have contacted the respective stops. The separation of the leading container from a conveyed row of abutted containers may be effected in various mechanical ways or this may be done manually. This feature forms no part of the present invention.

After the clamping members 86 are moved upward to release the covers, the three stop members 91, 92, and 92a are retracted and conveyer 13 is started. This moves the completed container beyond the treating station and advances the container previously held by stop 91 toward the treating station. After the two containers have cleared the stops such stops are again projected into the paths of the oncoming containers.

Control of Operation

Referring to FIG. 17, there is indicated at 120 a timer device comprising a shaft suitably journalled on the machine. This shaft is rotated by a small motor 121 through suitable gears 122, 123.

A number of narrow cams are mounted on the timer shaft for angular adjustment in a manner which is well known. Each cam element is adapted to operate a suitable switch contained in switch boxes from which rods project having follower rollers at their ends arranged to contact the cam surfaces. The rods are spring loaded so as to bear firmly upon the cams, and the various switches controlled by the rods may be normally open or normally closed as convenient for the particular control involved.

While FIG. 17, for simplicity, illustrates a number of single operating members controlled by the timer, it is to be understood that the switches in practice are connected to the sets of identical units to control them in synchronism. For example, the tilting of all four stitchers is controlled through a single cam switch.

FIG. 17 shows the operating units in their inoperative positions and shows stops 91 and 92 extended. A container is in position at the treating station and a second container is bearing against the advance stop 91. The conveyor 13 has just come to a stop. For simplicity of illustration, the stop element 92a has been omitted in this figure.

With the containers in place against the stops, the normally closed switches 91f and 93 are held in open position. These switches are arranged in parallel and control the flow of current to the conveyor motor 28. Thus, the conveyor is stopped when both switches are open.

Simultaneously with the stoppage of the conveyor motor 28, a circuit is closed to operate the timer motor 121. For this purpose the movable elements of switches 91f and 93 are connected with the movable elements of switches 125 and 126, whereby these switches will be closed when switches 91f and 93 are moved to open position. Switches 125 and 126 are connected in series through wire 127 and are further connected through wire 128 with one terminal of motor 121. A wire 129, connected to a power source 130, is connected with the other terminal of the motor. The circuit is completed by ground connections indicated at 131 at the power source and ground connection 132 at switch 125.

The motor 121 is controlled so that the timer shaft will make a single revolution and come to a stop. For this purpose the cam and switch unit m is arranged in an auxiliary circuit for the motor. This circuit extends from a ground connection through wire 135 to one terminal of the switch box. A wire 136 extends from the other terminal and meets wire 128 joined to one terminal of the motor. This auxiliary circuit is completed through the wire 129 previously described.

The cam for unit m has an operating portion designed to close its switch after switches 125 and 126 are closed to start the motor 121 and such operating portion keeps the switch closed through the remainder of approximately 350° of travel. This allows the switch to open after the shaft has rotated 360° under the joint control of switches 125 and 126 and cam switch m.

With the container in place at the treating station the first operation is to lower the cover clamping elements 86. These elements are controlled by cam switch b connected by wire 137 to a terminal of the coil of solenoid valve 138. The circuit is completed through ground connection 139 at the solenoid and conductor 140 joined with a power source 141 and ground connection 142.

The solenoid valve 138 is conventional and its particular construction may be varied as desired. This valve is herein indicated as a single solenoid, spring return type in which the spool is held by the solenoid coil as long as current flows through the coil. When the current is discontinued the spool is returned to original position by spring action. When fluid pressure is admitted in front of the pistons in cylinder 86g the clamping elements will move down against the main cover panels.

As the cover clamps are to remain in holding position through about 230° to 240° of rotation of the cam shaft the cam for switch unit b is formed with this angular extent of operating area.

The main flange folding or positioning elements 87 will be actuated after the cover clamps are in place. These elements 87 are controlled by cam switch unit c connected to the solenoid valve 145 through wire 146 and ground connections 147 and 140. This valve may also be of the single solenoid, spring return type. When fluid pressure is admitted in front of the piston in cylinder 87g the positioning elements will be rocked toward the cover hinges to bring the main flanges into positions somewhat inclined over the cover main panels. Considering the movement of the cover clamps as beginning at 0°, the flange positioning elements will be moved inward at about 20° to 25° of rotation of the cam shaft and will be returned at about 200° to 210°. The shape of the cam will conform to these requirements.

The speader fingers 88 are actuated after the positioning elements 87 have swung the flanges inward. Projection and retraction of the fingers 88 is controlled by cam switch unit f connected solenoid valve 148 through wire 149 and ground connections 150 and 140. This valve 148 is similar to valves 138 and 145. When fluid pressure is admitted behind the pistons in cylinders 88b the finger of each unit will be extended through the panel openings to spread the inner flanges away from the attached outer flanges, as above described, to facilitate insertion of the corner flaps. The spreader fingers will be extended after the flanges are positioned after the cam shaft has rotated approximately 40° and will be retracted at about 90°, after the cover flaps have been tucked between the attached flanges. The cam of unit f is shaped to conform to these requirements.

The folders 89 for swinging the short end flanges upward and tucking in the corner flaps are controlled by cam switch unit d connected to solenoid valve 152 through wire 153 and ground connections 154 and 140. This valve may be similar to the previously described valves. Admission of fluid under pressure in front of the pistons in cylinders 89d will swing the folders up and the corner flaps in to their final positions where they are held until the stitches are in place. The folders are swung up at about 60° of revolution of the cam shaft and returned at about 180°, after the corner flaps have been secured in place. The shape of the cam will conform to these requirements.

The positioning of the stitchers 90 is effected as soon as the corner flaps are in place. As above described, this involves tilting the stitchers to bring the setting jaws into encompassing relation to the flange edge portions. As herein indicated, the tilting of the stitchers is controlled by cam switch unit e connected to solenoid valve 155 through wire 156 and ground connections 157 and 140. This valve may be similar to those previously described. Admission of fluid under pressure back of the pistons in cylinders 107 will cause the stitcher units to swing into stitch driving position with the cover flanges where they are held until the stitches are driven. Tilting of the stitchers is begun when the cam shaft has rotated approximately 90° and they are returned to their original inoperative position at approximately 180°. The shape of the cam for the switch unit e will conform to these requirements.

While the stitcher units are held tilted in their operative positions the stitches are driven. Driving of the stitches is controlled by cam switch unit i which, when closed, energizes the solenoid of the single-revolution, solenoid-actuated clutch 111a to transmit driving force from the constantly operating motor 111 through transmission belts 115a, 113 and 97. See FIGS. 1 and 2. The cam switch is connected to the clutch solenoid through wire 158 and ground connections 159 and 140. Driving of the stitches occurs approximately midway of the period required for the complete movement of the stitchers, and the shape and position of the cam for this switch unit is made to conform to this requirement.

As soon as the stitches have been driven the stitcher unit will be tilted back to its inoperative position, the folders 89 will be swung clear of the covers, and the cover clamping elements 86 will thereafter be raised to their original positions as described above. The container at the treating station is now complete and ready to be discharged from this position as soon as the stops 92 and 92a are retracted. The cam shaft at this point will have rotated an angular distance of approximately 240°.

The stops 92 and 92a at the treating station and advance stop 91 will now be retracted. In the present instance the movement of the stops is illustrated as controlled by separate cam switch units. Unit g controls the stop 91 and unit h controls the two stops 92 and 92a.

The switch unit g for stop 91 is connected to the single-solenoid, spring-return valve 159 through wire 160 and ground connections 161 and 140. Admission of fluid pressure in front of the piston in cylinder 91e will cause the stop to be retracted to clear the container for advancing movement.

The switch unit h for stop 92 is connected to the solenoid valve 163, which is identical with valve 159, through wire 164 and ground connections 165 and 140. Admission of fluid pressure in front of the piston in cylinder 92h will cause stop 92 to be retracted clear of the container which it has been holding. It is to be understood that stop 92a opposite to stop 92 is controlled by an identical piston and cylinder mechanism and its solenoid valve is connected in like manner through cam switch unit h.

With all stops retracted the two containers which have been held at the stops will be conveyed past the stops after the conveyor has been started. By the withdrawal of the stops the fingers of switches 91f and 93 are free to move outward thus allowing these normally closed switches to close, thus closing the circuit to motor 28 to start the conveyor. Current for the motor flows through wire 167 to wire 140 and thence through power source 141 and ground connection 142. At the other side of the motor the current passes through wire 168 and 169 through switch 93 and ground connection 170. Switch 91f being in parallel with switch 93 provides an additional branch of the motor circuit through wire 168 and ground connection 171. It is to be noted that this arrangement of switches 91f and 93, as previously explained, is for the purpose of keeping the conveyor motor circuit closed until a container has engaged the switch finger of each stop 91 and 92.

At the same time that the switches 91f and 93 move to their closed position the switches 125 and 126 are opened and remain open until the switches 91f and 93 are again closed. These switches 125 and 126, as previously explained, serve to close the circuit for the timer motor 121. At this time, however, the opening of the switches will not cut off the current from the motor 121 because the cam for switch m is continuing to bear upon the switch rod, keeping the motor operating through the auxiliary circuit 135, 136, 129, 130 and 131.

With the stops retracted, the conveyor continues to be driven by the motor 28 and the timer shaft continues to be driven through the circuit described above. The containers thus pass beyond the stops 91 and 92 previously retaining them. The container, passing stop 91, advances toward the treating station and a new container advances on conveyor 13 toward stop 91. As soon as the conveyor has traveled a sufficient distance to bring the trailing ends of the containers clear of the stops, these stops are again extended into the paths of the oncoming containers. The operating portions of the cams of switch units g and h are of a suitable length and adjusted to the proper angular positions to produce this timing of the movement of the stops. More explicitly, the projection of the stops is effected by opening the switches g and h to allow the springs of the solenoid valves to reverse the positions of the valves and admit fluid pressure behind the pistons in the cylinders for the stops.

Movement of the cams on the timer shaft to cause the projection of the stops completes the cycle of operations of the timer. The timer shaft is then stopped by opening the circuit for motor 121. Since the switches 125 and 126 remain open so long as there is no container bearing against either switch finger of switches 91f and 93, the switch unit m is in sole control of the motor circuit. As the motor may be stopped immediately after the stop elements are projected, the cam for switch unit m is so adjusted that its operating portion will pass out of contact with the cam follower roll after a brief interval following the opening of switches g and h controlling the stops. Thus, the rotation of the timer shaft is discontinued.

The motor 28, driving the conveyor, continues to run after a container has come against stop 92 and has moved the finger of switch 93 and until another container has moved against stop 91 and has moved the finger of switch 91f. With switches 91f and 93 arranged in parallel, the opening of both switches is required to stop motor 28.

After both switches 91f and 93 are opened it is apparent that both the related switches 125 and 126 will be closed. By closing both of these switches a circuit is completed for motor 121, as above explained, and the timer shaft is thus started on a new cycle.

As will be apparent to those skilled in the art, the specific wiring and control elements may be varied extensively without departing from the spirit of the invention. In practice, numerous additional control and safety devices are employed for convenience and safety of the operators, but having no effect on the broad principles of operation.

To review the operation—a supply of containers is provided which will be complete except for folding and securing their cover flanges. The containers are delivered onto the conveyor 13 with their covers outwardly extending. If the machine is being started into operation the attendant will manually place a container adjacent stops 92 and 92a and a second container adjacent the advance stop 91. Current is then delivered to the necessary circuits. Conveyor 13 will then start and cause the containers to advance against the stops. When a container is present against the advance stop as well as the stops at the treating station, switches 91f and 93 will be opened, cutting off current to the conveyor motor. At the same time switches 125 and 126 will be closed to start the timer shaft motor 121. After the timer shaft 120 has begun to rotate, an additional circuit through switch unit m is closed to keep the motor circuit closed independently of switches 125 and 126 which are moved to open position near the end of the operating cycle as conveyor 13 is started to discharge the completed case and deliver new cases against the two sets of stops.

As the timer shaft rotates the cams of the switch units actuate switches in proper timing to lower the clamping elements 86 against the cover main panels, then position the main flange by positioning elements 87. The two flange sections of each cover are then spread apart at each end by spreader fingers 88 and the corner flaps are tucked in between the flange sections by elements 89. Following this, the stitcher units are moved into position and a stitch is driven through the end portions of each flange and passing through the corner flaps to hold the flanges rigidly in place.

After the treating elements have been moved back to their inoperative positions the stops are retracted; the conveyor is placed in motion; the finished container is discharged; and the stops are again projected to stop the next advancing containers. Immediately after the stops are projected, due to the operation of the cam switch units g and h, the switch unit m, then in sole control of the timer motor, moves to open position and stops the timer.

As soon as two containers are again in contact with the stops, and the switches 91f and 93 are actuated, stopping the conveyor, the companion switches 125 and 126 will be moved to closed position to restart the timer motor. The cycle is thus repeated.

For simplicity of description various parts of the containers and operating mechanism have been referred to as positioned or movable horizontally or vertically. It is desired that such description be considered solely for convenience and ease in understanding the invention and not in a limiting sense.

While the present description sets forth a preferred embodiment of the invention, numerous changes may be made in the construction without departing from the spirit of the invention, and it is therefore desired that the present embodiment be considered in all respects as illustrative and not restrictive, reference being had to the appended claims rather than to the foregoing description to indicate the scope of the invention.

We claim:

1. In a machine for assembling the projecting flanges on a resilient paperboard container cover of the type comprising an elongated rectangular main panel carrying a flange of double thickness along its outer edge formed by two integrally hinged, juxtaposed, narrow panels joined flatwise along a substantial length of their mid-portions and having their end portions left unsecured, the cover main panel having an end flange on an edge of the panel adjacent the end of the double flange, such end flange carrying a corner flap insertable between the unsecured end portions of the panels of the double flange, the combination of a support for a container having a cover of the type described, means for holding the cover in an extended position, means for folding the double flange to raised position relative to the inside surface of the cover main panel, means for folding the corner flap on the end flange to raised position approximately in the plane of the raised double flange, means for spreading apart the adjacent unsecured end portions of such flange to admit the corner flap between them, means for swinging the end flange to raised position while maintaining the separated positions of the end portions of the double flange, guide means for the corner flap to direct it between the separated portions of the double flange, and means for releasing the spreading means to allow the separated portions of the double flange to move toward their original positions to embrace the corner flap.

2. Mechanism as defined in claim 1, including means for securing the corner flap between the embracing panels of the double flange.

3. Mechanism as defined in claim 1, in which the support for the container comprises a conveyor for advancing the container to the cover treating means.

4. In a machine for assembling flange parts on a hinged cover carried on the upper edge of a wall at the open top of a container formed from resilient paperboard, the cover being of the type comprising an elongated rectangular main panel carrying a flange of double thickness along the edge opposite the hinge, the double flange being formed by two integrally hinged, narrow panels joined flatwise along a substantial length of their mid-portions and having their end portions left unsecured, the cover main panel having an end flange on an edge adjacent the end of the double flange, such end flange carrying a corner flap insertable between the unsecured end portions of the panels of the double flange, the combination of a support for containers of the type described, means for holding the cover in an extended position with the double flange and corner flap folded to upright position relative to the inside surface of the cover main panel, means for spreading apart the adjacent unsecured end portions of the double flange to admit the corner flap between them, means for swinging the end flange to raised position while maintaining the separated positions of the end portions of the double flange, guide means for the corner flap to direct it between the separated portions of the double flange, and means for releasing the spreading means to allow the separated portions of the double flange to move toward their original positions to embrace the corner flap.

5. Mechanism as defined in claim 4, including means for stitching the corner flap in place between the embracing panels of the double flange.

6. In a machine for assembling the projecting flanges on a resilient paperboard container cover of the type comprising an elongated rectangular main panel carrying a flange of double thickness along one side edge, formed by two integrally hinged, narrow panels joined flatwise along a substantial length of their mid-portions and with their end portions left relatively unsecured and separable, the cover main panel having an end flange on an edge adjacent the end of the double flange, such end flange carrying a corner flap insertable between the unsecured end portions of the panels of the double flange, the combination of a support for a container having a cover of the type described, means independent of such support for holding the cover extended in a fixed plane, means for guiding the cover edgewise into operative relation to said cover holding means, means for folding the double flange to raised position relative to the inside surface of the cover main panel, means for folding the corner flap on the end flange to raised position approximately in the plane of the raised double flange, means operable while the cover is being held by the cover holding means for swinging the end flange to raised position, guide means for the corner flap to direct it between the unsecured portions of the double flange, and means for securing the corner flap between such flange end portions.

7. In a machine for assembling flange parts on a hinged cover carried on the upper edge of a wall at the open top of a container formed from resilient paperboard, the cover being of the type comprising an elongated rectangular main panel carrying a flange of double thickness along the edge opposite the hinge, the double flange being formed by two narrow panels joined flatwise along a substantial length of their mid-portions and having their end portions left relatively unsecured and separable, the cover main panel having an end flange on an edge adjacent the end of the double flange, such end flange carrying a corner flap insertable between the unsecured portions of the double flange, the combination of a support for a container of the type described, means independent of such support for holding the cover extended in a fixed plane with the double flange and corner flap folded to raised position relative to the inside surface of the cover main panel, means for guiding the cover edgewise into operative relation to said cover holding means, means for swinging the end flange to raised position, and guide means for the corner flap to direct it between the unsecured portions of the double flange as the end flange is swung to raised position.

8. In a machine for assembling flange parts on a hinged cover carried on the upper edge of a wall at the open top of a container formed from resilient paperboard, the cover being of the type comprising an elongated rectangular main panel carrying a flange of double thickness along the side opposite the hinge, the double flange being formed by two narrow panels joined flatwise along a substantial length of their mid-portions and with their end portions left unsecured, one of the flange panels being formed with a small aperture in its unsecured portion, the cover main panel having an end flange on an edge adjacent the end of the double flange, such end flange carrying a corner flap insertable between the unsecured portions of the panels of the double flange, the combination of a support for a container of the type described, means for holding the cover in an extended position, with the double flange folded to upright position relative to the inside surface of the cover main panel, means for folding the corner flap on the end flange to raised position approximately in the plane of the raised double flange, a movable spreading finger positioned to pass through the aperture in the flange panel to engage the unsecured portion of the adjacent imperforate panel and displace it from the apertured panel portion to admit the corner flap between the panels, means for swinging the end flange to raised position thus swinging its corner flap, guide means for the corner flap to direct it between the separated portions of the double flange, and means for advancing and retracting the spreading finger in timed relation with the operation of the means for folding the end flange and corner flap, whereby the finger will move through the apertured panel and held while the corner flap is inserted between the separated panels of the double flange.

9. In a machine for securing flange parts on covers of paperboard containers, such covers being of the type having a rectangular shape and having a flange extending along one edge, an additional flange extending along an adjacent edge and carrying a corner flap for attachment to the first mentioned flange, the combination of a base frame, a support associated therewith for a container having a cover of the type described, means for holding the cover in extended position with the flanges raised and with the corner flap in lapped relation to the first mentioned flange, a stitching mechanism including stitch driving means and a clinching anvil in operative relation to the stitch driving means, a supporting frame for the stitching mechanism, operating mechanism for the stitch driving means including a shaft journalled on the base frame, means for mounting the stitcher supporting frame for tilting movement on the base frame about an axis coincident with that of the shaft, the stitching means being positioned on the base frame in such relation to the cover holding means that the stitch driving means and clinching anvil will move into operative relation with the assembled flange parts on the cover when the stitcher supporting frame is tilted, and means for driving said shaft to operate the stitching mechanism to drive a stitch through such assembled flange parts.

10. In a machine for securing flange parts on covers of paperboard containers, such covers being of the type having a rectangular shape and having a flange extending along one edge, an additional flange extending along an adjacent edge and carrying a corner flap for attachment to the first mentioned flange, the combination of a base frame, a support associated therewith for a container having a cover of the type described, means for holding the cover in extended position with the flanges raised and with the corner flap in lapped relation to the first mentioned flange, a stitching mechanism including stitch driving means and a clinching anvil in operative relation to the stitch driving means, a supporting frame for the stitching mechanism, operating mechanism for the stitch driving means, means for mounting the stitcher supporting frame for tilting movement on the base frame, the stitching means being positioned on the base frame in such relation to the cover holding means that the stitch driving means and clinching anvil will move into operative relation with the assembled flange parts on the cover when the stitcher supporting frame is tilted, control means for actuating the stitching mechanism to drive a stitch through such assembled flange parts, motor means for tilting the stitching mechanism frame into and out of operative stitching relation to the assembled flange parts, and control means for said motor means, timed to actuate such motor means to swing the stitching mechanism to inoperative position after a stitch has been driven.

11. In a machine for securing flange parts on covers of paperboard containers, such covers being of the type having a rectangular shape and having a flange extending along one edge, an additional flange extending along an adjacent edge and carrying a corner flap for attachment to the first mentioned flange, the combination of a base frame, a support associated therewith for a container having a cover of the type described, means for holding the cover in extended position with the flanges raised and with the corner flap in lapped relation to the first mentioned flange, a stitching mechanism including a stitch driving means and a clinching anvil in operative relation to the stitch driving means, a supporting frame for the stitching mechanism, operating mechanism for the stitch driving means, means for mounting the stitcher supporting frame for movement into and out of operative stitching position with respect to the assembled flange parts, control means for actuating the stitching mechanism to drive a stitch through such assembled flange parts, motor means for moving the stitching mechanism into and out of operative stitching relation to the assembled flange parts, and control means for actuating the motor means, timed to move the stitching mechanism to its inoperative position after a stitch has been driven.

12. In a machine for assembling flange parts on a hinged cover carried on the upper edge of a wall at the open top of a container formed from resilient paperboard, the cover comprising an elongated rectangular main panel carrying an outer flange along the edge opposite the hinge, and carrying an end flange on an edge of the panel adjacent the end of the outer flange, such end flange carrying a corner flap adapted to be secured to the outer flange, the combination of a base frame, a cover clamping and flange folding mechanism comprising a support fixed on the frame and arranged to receive contact by the outer surface of an extended cover of a container of the type described, a clamping member mounted for movement toward and from the fixed support, a flange folding element mounted at a level above the fixed support and located in the path of the outer flange of the cover when the cover, with the outer flange extended in the plane of the cover main panel, is forced by the clamping means against the fixed support, whereby the outer flange is folded upward away from the support and toward the inside surface of the cover.

13. Mechanism as defined in claim 12, in which the flange folding element is mounted for movement toward the cover hinge to bring the outer flange to an inclined position over the inside surface of the cover main panel.

14. Mechanism as defined in claim 12, in which the flange folding element is of a length to project into the path of the corner flap, when such flap is extended in the plane of the cover main panel, whereby the corner flap will be folded into substantially the same plane as the outer flange when the clamping member forces the cover main panel against the fixed support.

15. In a machine for assembling flange parts on a hinged cover carried on the upper edge of a wall at the open top of a container formed from resilient paperboard, the cover comprising an elongated rectangular main panel carrying an outer flange along the side edge opposite the hinge, and carrying an end flange on an edge of the panel adjacent the end of the outer flange, such end flange carrying a corner flap adapted, when folded, to be secured to the outer flange, the combination of a base frame, a cover clamping and flange folding mechanism comprising a support fixed on the frame and arranged to receive contact by the outer surface of an extended cover of a container of the type described, a clamping member mounted for movement toward and from the fixed support, a folding element mounted at a level above the fixed support and located in the paths of the outer flange and the corner flap when the cover, with the outer flange and corner flap extended in the plane of the cover main panel, are forced by the clamping member against the fixed support, whereby the outer flange and corner flap are folded upward away from the support and toward the inside surface of the cover, said folding element for the outer flange and corner flap being mounted for movement toward the cover hinge to bring such outer flange and corner flap to substantially the same inclined position over the inside surface of the cover main panel.

16. Mechanism as defined in claim 15, including an end flange folding element mounted for movement against the end flange to fold it upright with respect to the inside surface of the cover main panel, guiding means associated with the outer flange folding element for guiding the folded corner flap into lapping relation with the outer flange.

17. In a machine for operating upon containers and other articles, the combination of an elongated conveyor, an electric motor for driving the conveyor, a circuit for the motor including a source of current, treating elements at a treating station located adjacent the path of containers on the conveyor and spaced from the discharge end of the conveyor, a retractable stop member to hold a container at the treating station, means for retracting and extending the stop whereby a treated container may be released to advance on the conveyor and an untreated container, arriving on the conveyor, may be stopped, a timer shaft having a timing cam fixed thereon, an electric motor for rotating the shaft, a cam actuated switch in operative relation to the cam, a conducting circuit for the cam shaft motor including a source of current, a second cam on the shaft for controlling the stop retracting and extending means, such cam acting to retract the stop at a predetermined time and thereafter at a predetermined time to extend the stop, thus releasing a treated container and stopping the next advancing, untreated container, two connected switches associated with the stop, one switch being normally closed and located in the conveyor motor circuit, the other switch being normally open and located in the timer motor circuit, trip means actuated by a container moving against the stop in its extended position for opening the conveyor motor switch and closing the timer motor switch, thus stopping the conveyor motor and starting the timer motor, an auxiliary conducting circuit to operate the timer motor from its source of current, said auxiliary circuit being controlled by the timer cam switch, the cam operating surface for closing its switch and maintaining it closed being effective immediately before retraction of the stop to release a treated container and to the point in the rotation of the cam shaft where it has completed a single rotation.

18. Mechanism as defined in claim 17, including an advance stop for holding a container on the conveyor prior to its delivery to the treating station, means for retracting and extending the advance stop out of and back into the path of a container on the conveyor, a normally closed switch associated with the advance stop, means for controlling the stop moving means to retract and extend the stop substantially in unison with the movements of the treating station stop, said advance stop switch having trip means actuated by a container moving against such stop to move the switch to open position, such switch being located in the conveyor motor circuit in parallel with the normally closed switch associated with the treating station stop, whereby a container must be in engagement with the trip on each stop to open the conveyor motor circuit and stop the conveyor.

References Cited in the file of this patent

UNITED STATES PATENTS

| | | |
|---|---|---|
| 2,060,930 | Ellacott | Nov. 17, 1936 |
| 2,868,093 | Schmied | Jan. 13, 1959 |